US012799360B2

(12) United States Patent
Johnson et al.

(10) Patent No.: US 12,799,360 B2
(45) Date of Patent: Nov. 17, 2026

(54) COMPOSITION AND METHOD FOR SELECTIVE OXIDE CMP

(71) Applicant: CMC Materials, Inc., Aurora, IL (US)

(72) Inventors: Brittany Johnson, Wood Dale, IL (US); Alexander W. Hains, Aurora, IL (US); Sarah Brosnan, St. Charles, IL (US); Steven Kraft, Elgin, IL (US)

(73) Assignee: CMC Materials LLC, Aurora, IL (US)

(*) Notice: Subject to any disclaimer, the term of this patent is extended or adjusted under 35 U.S.C. 154(b) by 31 days.

(21) Appl. No.: 17/077,485

(22) Filed: Oct. 22, 2020

(65) Prior Publication Data

US 2021/0115302 A1 Apr. 22, 2021

Related U.S. Application Data

(60) Provisional application No. 62/924,352, filed on Oct. 22, 2019.

(51) Int. Cl.
*C09G 1/00* (2006.01)
*C09G 1/02* (2006.01)
*C09G 1/16* (2006.01)
*C01F 17/235* (2020.01)

(52) U.S. Cl.
CPC ................. *C09G 1/02* (2013.01); *C09G 1/16* (2013.01); *C01F 17/235* (2020.01); *C01P 2004/38* (2013.01); *C01P 2004/64* (2013.01); *C01P 2006/12* (2013.01)

(58) Field of Classification Search
CPC .. C01F 17/235; C01F 17/241; C01P 2004/03; C01P 2004/04; C01P 2004/38; C01P 2004/51; C01P 2004/62; C01P 2004/64; C01P 2006/12; C09G 1/02; C09G 1/16
See application file for complete search history.

(56) References Cited

U.S. PATENT DOCUMENTS

| | | | | |
|---|---|---|---|---|
| 9,070,632 | B2 | 6/2015 | Raman et al. | |
| 2002/0011031 | A1* | 1/2002 | Hattori ............. | H01L 21/31053 106/3 |
| 2002/0095872 | A1* | 7/2002 | Tsuchiya ............. | C09K 3/1463 106/3 |
| 2004/0223898 | A1* | 11/2004 | Ota ...................... | C01F 17/235 423/263 |
| 2007/0269987 | A1* | 11/2007 | Nakano .................... | C09G 1/02 257/E21.244 |

(Continued)

FOREIGN PATENT DOCUMENTS

| | | | |
|---|---|---|---|
| EP | 1219568 | A2 | 7/2002 |
| JP | 2001323256 | A | 11/2001 |

(Continued)

OTHER PUBLICATIONS

Taiwan Intellectual Property Office, Search Report issued in connection with Taiwan Patent Application No. 109136667 on Oct. 6, 2021.

(Continued)

*Primary Examiner* — Shuangyi Abu Ali

(57) ABSTRACT

A chemical mechanical polishing composition for polishing a substrate having a silicon oxygen material includes a liquid carrier, cubiform ceria abrasive particles dispersed in the liquid carrier, and at least one of an anionic compound and a nonionic compound.

12 Claims, 3 Drawing Sheets

(56) References Cited

U.S. PATENT DOCUMENTS

| | | | |
|---|---|---|---|
| 2008/0045020 A1 | 2/2008 | Kim et al. | |
| 2010/0003897 A1 | 1/2010 | Kim et al. | |
| 2012/0108064 A1 * | 5/2012 | Suzuki | B24B 37/044 438/689 |
| 2013/0244432 A1 | 9/2013 | Reiss | |
| 2015/0147884 A1 | 5/2015 | Kato et al. | |
| 2017/0194160 A1 | 7/2017 | Pallikkara Kuttatoor et al. | |
| 2019/0322899 A1 * | 10/2019 | Kinuta | C01G 25/00 |
| 2020/0198982 A1 * | 6/2020 | Suda | C01F 17/235 |

FOREIGN PATENT DOCUMENTS

| | | | | | |
|---|---|---|---|---|---|
| JP | 2011171689 A | | 9/2011 | | |
| JP | 2015224276 A | | 12/2015 | | |
| JP | 2017186196 A | | 10/2017 | | |
| KR | 100851235 B1 | | 8/2008 | | |
| KR | 20180068424 A | * | 6/2018 | | |
| WO | 2013067696 A1 | | 5/2013 | | |
| WO | 2014039580 A1 | | 3/2014 | | |
| WO | 2016006553 A1 | | 1/2016 | | |
| WO | 2016047725 A1 | | 3/2016 | | |
| WO | 2016140968 A1 | | 9/2016 | | |
| WO | 2016141259 A1 | | 9/2016 | | |
| WO | 2016141260 A1 | | 9/2016 | | |
| WO | 2018124017 A1 | | 7/2018 | | |
| WO | WO-2018124013 A1 | * | 7/2018 | | B24B 37/00 |
| WO | WO-2018229005 A1 | * | 12/2018 | | C01F 17/206 |

OTHER PUBLICATIONS

Korean Intellectual Property Office Acting as ISA, International Search Report and Written Opinion of the International Searching Authority issued in connection with PCT/US2020/056818 on Feb. 17, 2021.

English translation of Office Action issued in Chinese counterpart application No. 202080074244.8, mail date of Office Action Apr. 8, 2023.

Third Party Observations received in counterpart European Application No. 20878842.2, mail date of Office Action Apr. 14, 2023.

* cited by examiner

COMPOSITION AND METHOD FOR SELECTIVE OXIDE CMP

CROSS REFERENCE TO RELATED APPLICATIONS

This application claims the benefit of U.S. Provisional Application Ser. No. 62/924,352 entitled Composition and Method for Selective Oxide CMP, filed Oct. 22, 2019.

BACKGROUND OF THE INVENTION

Chemical mechanical polishing is a key enabling technology in integrated circuit (IC) and micro-electro-mechanical systems (MEMS) fabrication. CMP compositions and methods for polishing (or planarizing) the surface of a substrate (such as a wafer) are well known in the art. Polishing compositions (also known as polishing slurries, CMP slurries, and CMP compositions) commonly include abrasive particles suspended (dispersed) in an aqueous solution and chemical additives for increasing the rate of material removal, improving planarization efficiency, and/or reducing defectivity during a CMP operation.

Cerium oxide (ceria) abrasives are well known in the industry, particularly for polishing silicon containing substrates, for example, including silicon oxide materials, such as tetraethylorthosilicate (TEOS), silicon nitride, and/or polysilicon. Ceria abrasive compositions are commonly used in advanced dielectric applications, for example including shallow trench isolation applications. While the use of ceria abrasives is known, there remains a need for improved ceria abrasive based CMP compositions. In particular, there remains a need for CMP compositions that provide improved removal rates and improved planarization (e.g., reduced erosion and dishing). The further remains a need for compositions providing removal rate selectivity of one silicon containing material to another (e.g., silicon oxide to silicon nitride selectivity or silicon oxide to polysilicon selectivity).

BRIEF SUMMARY OF THE INVENTION

A chemical mechanical polishing composition for polishing a substrate having a silicon oxygen material (such as silicon oxide) is disclosed. In one embodiment, the polishing composition comprises, consists of, or consists essentially of a liquid carrier, cubiform ceria abrasive particles dispersed in the liquid carrier, and at least one of an anionic compound and a nonionic compound.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION OF THE INVENTION

A chemical mechanical polishing composition for polishing a substrate having a silicon oxygen material (such as silicon oxide) is disclosed. The polishing composition comprises, consists of, or consists essentially of a liquid carrier, cubiform ceria abrasive particles dispersed in the liquid carrier, and at least one of an anionic compound and a nonionic compound. In one embodiment, the polishing composition comprises an anionic polymer such as poly (acrylic acid), poly(methacrylic acid), and/or poly(vinylsulfonic acid). In another embodiment, the polishing composition comprises a nonpolymeric anionic compound such as 4-dodecylbenzenesulfonic acid. In still another embodiment, the polishing composition comprises a nonionic polymer such as polyvinylpyrrolidone or poly(vinylpyrrolidone-co-vinyl acetate).

The disclosed polishing compositions and corresponding (CMP methods) may confer significant and unexpected advantages. For example, the disclosed compositions may provide significantly improved silicon oxide removal rates and may therefore improve throughput and save time and money. The disclosed compositions may further provide improved selectivity to silicon nitride and/or polysilicon layers and may therefore provide further process flexibility.

The polishing composition contains abrasive particles including cubiform cerium oxide abrasive particles suspended in a liquid carrier. By "cubiform" it is meant that the ceria abrasive particles are in the form or shape of a cube, i.e., substantially cubic. Stated another way, the cubiform ceria abrasive particles are cubic in form or nature. However, it will be understood that the edge dimensions, corners, and corner angles need not be exactly or precisely those of a perfect cube. For example, the cubiform abrasive particles may have slightly rounded or chipped corners, slightly rounded edges, edge dimensions that are not exactly equal to one another, corner angles that are not exactly 90 degrees, and/or other minor irregularities and still retain the basic form of cube. One of ordinary skill in the art will be readily able to recognize (e.g., via scanning electron microscopy or transmission electron microscopy) that the cubiform ceria abrasive particles are cubic in form with tolerances generally allowed for particle growth and deagglomeration.

Figure 1:
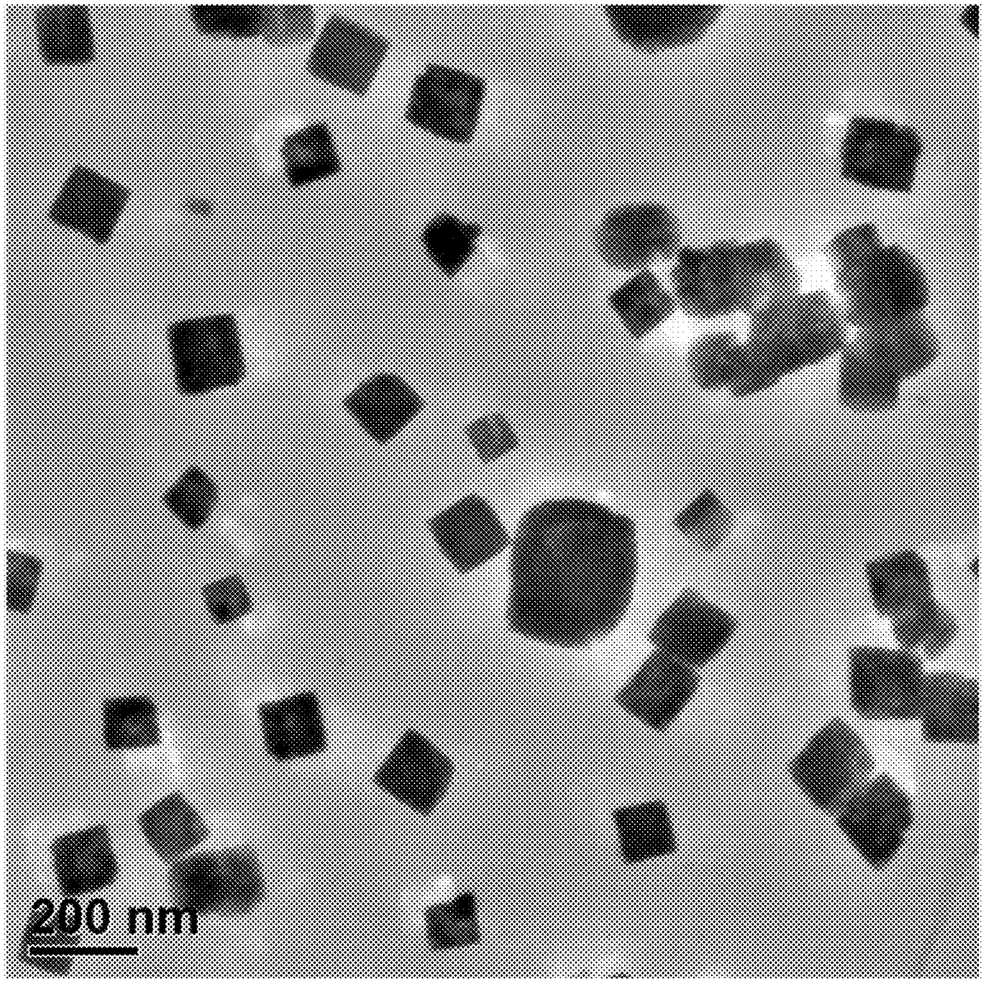
FIGS. 1 and 2 depict transmission electron microscopy (TEM) micrographs of a cubiform ceria abrasive sample showing ceria abrasive particles having square faces.
Figure 2:
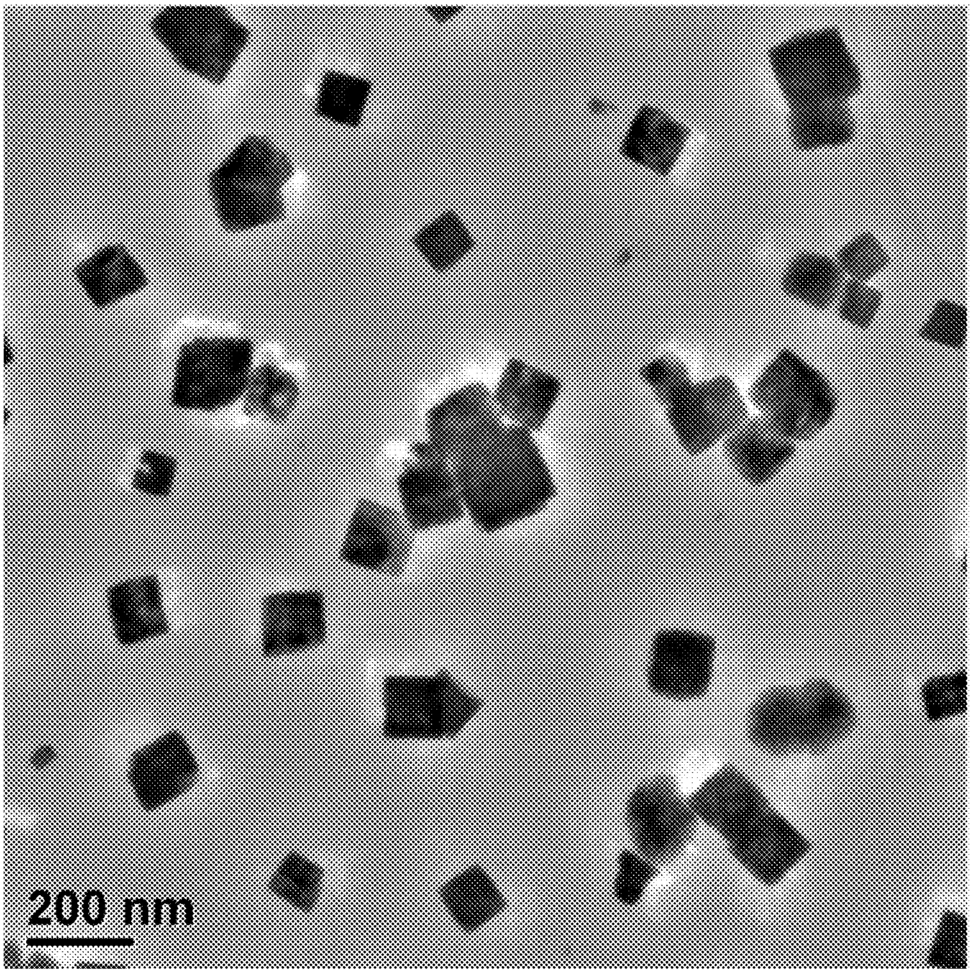
Figure 3:
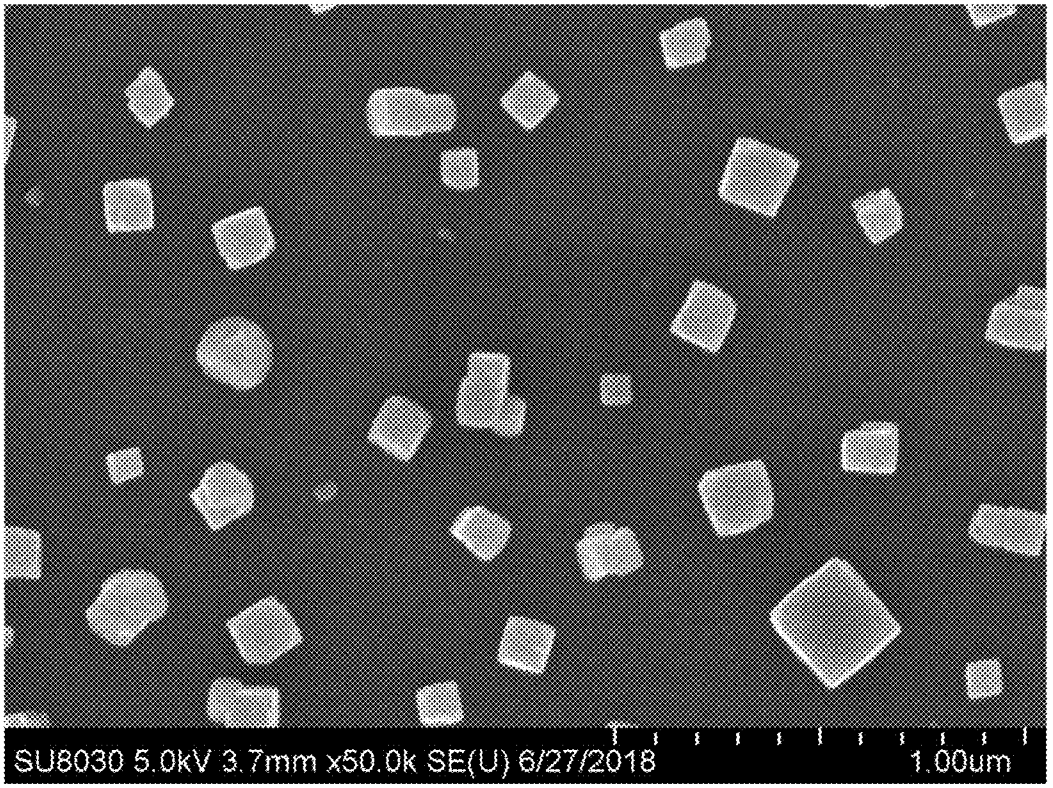
FIG. 3 depicts a scanning electron microscopy (SEM) micrograph of a cubiform ceria abrasive sample showing ceria abrasive particles having square faces.

FIGS. 1, 2, and 3 depict example cubiform ceria abrasive particles. These transmission electron microscopy (TEM) and scanning electron microscopy (SEM) images depict ceria abrasive particles having square faces. For example, in these images the depicted particle faces each include four edges having substantially the same length (e.g., within 20 percent of one another or even within 10 percent or less of one other). Moreover the edges meet at corners at approximately 90 degree angles (e.g., within a range from about 80 to 100 degrees or from about 85 to about 95 degrees). One of ordinary skill in the art will readily appreciate that in the TEM and SEM images a significant majority of the depicted abrasive particles are cubiform in that they have square faces as defined above. Some of the particles may be observed to include defects, for example, on one or more corners. Again, it will be understood that the term cubiform is not intended to describe ceria abrasive particles that are precisely cubic, but rather particles that are generally cubic in nature as described above and depicted in FIGS. 1, 2, and 3.

As used herein, a chemical mechanical polishing composition including a cubiform ceria abrasive is one in which at least 25 number percent of the abrasive particles are cubic in nature (cubic in form or shape as described above). In preferred embodiments, at least 40 number percent (e.g., at least 60 percent, or at least 80 percent) of the abrasive particles are cubic in nature. As noted above, the cubiform ceria abrasive particles may be readily evaluated and counted using TEM or SEM images, for example, at a magnification in a range from about 10,000× to about 500,000λ. SEM or TEM images show abrasive particles having faces with four sides with similar length (e.g., within 20 percent of one another). The images also show that adjacent sides are approximately perpendicular, for example, forming an angle of about 90 degrees (e.g., within a range from about 80 to about 100 degrees). To determine whether or not a ceria abrasive composition includes cubiform ceria abrasive particles, SEM or TEM observation shall be made on a large number of randomly selected particles (i.e., more than 200) so that it is possible to perform a statistical analysis and thereby determine a percentage of the particles that have a square face). The particles retained must be such that their images are well visible on the micrographs. Some of the particles may exhibit some defects either on their surface and/or one or more of their corners and still be counted as being cubiform.

The cubiform ceria abrasive particles may be substantially pure ceria abrasive particles (within normal tolerances for impurities) or doped ceria abrasive particles. Doped ceria abrasive particles may include interstitial dopants (dopants that occupy a space in the lattice that is not normally occupied) or substitutional dopants (dopants that occupy a space in the lattice normally occupied by cerium or oxygen atoms). Such dopants may include substantially any metal atom, for example, including Ca, Mg, Zn, Zr, Sc, or Y.

In certain advantageous embodiments, the dopants may include one or more Lanthanides, for example, including lanthanum, praseodymium, neodymium, promethium, samarium, and the like. In one particularly suitable embodiment, the cubiform ceria abrasive particles include a mixed oxide of cerium and lanthanum. The mixed oxide abrasive particles may have a molar ratio of La to (La+Ce) in range from about 0.01 to about 0.15, for example, from about 0.01 to about 0.12. It will be understood that such abrasive particles may additionally include other elements and/or oxides (e.g., as impurities). Such impurities may originate from the raw materials or starting materials used in the process of preparing the abrasive particles. The total proportion of the impurities is preferably less than 0.2% by weight of the particle. Residual nitrates are not considered as impurities.

In certain embodiments, the molar ratio of La to (La+Ce) may be in a range from about 0.01 to about 0.04 (e.g., from about 0.02 to about 0.03). In one such embodiment, the cubiform ceria abrasive particles include about 2.5 mole percent lanthanum oxide and about 97.5 mole percent cerium oxide. In other embodiments, the molar ratio may be in a range from about 0.08 to about 0.12 (e.g., from about 0.09 to about 0.11). In one such other embodiment the cubiform ceria abrasive particles include about 10 mole percent lanthanum oxide and about 90 mole percent cerium oxide. The abrasive particles may be a single phase solid solution with the lanthanum atoms substituting cerium atoms in the cerium oxide crystalline structure. In one embodiment, the solid solution exhibits a symmetrical x-ray diffraction pattern with a peak located between about 27 degrees and about 29 degrees that is shifted to a lower angle than pure cerium oxide. A solid solution may be obtained when the temperature of the aging sub-step (described below) is higher than about 60 degrees C. As used herein the term "solid solution" means that x-ray diffraction shows only the pattern of the cerium oxide crystal structure with or without shifts in the individual peaks but without additional peaks that would indicate the presence of other phases.

The cubiform ceria abrasive particles may also optionally be characterized by their specific surface area as determined on a powder by adsorption of nitrogen using the Brunauer-Emmett-Teller method (BET method). The method is disclosed in ASTM D3663-03 (reapproved 2015). The abrasive particles may have a specific surface area in a range from about 3 to about 14 $m^2/g$ (e.g., from about 7 to about 13 $m^2/g$ or from about 8 to about 12 $m^2/g$).

The cubiform ceria abrasive particles may optionally also be characterized by their average particle size and/or particle size distribution. The abrasive particles may have an average particle size in a range from about 50 nm to about 1000 nm (e.g., from about 80 nm to about 500 nm, from about 80 nm to about 250 nm, from about 100 nm to about 250 nm, or from about 150 nm to about 250 nm). Moreover, the average particle size may be greater than about 50 nm (e.g., greater than about 80 nm or greater than about 100 nm). The average particle size may be determined via dynamic light scattering (DLS) and corresponds to a median particle diameter (D50). DLS measurements may be made, for example, using a Zetasizer (available from Malvern Instruments). Those of ordinary skill in the art will readily appreciate that DLS measurements may significantly under count small particles when measured in the presence of comparatively larger particles. For the cubiform ceria abrasive particles disclosed herein the DLS technique tends to under count particles below about 40 nm. It will be understood that the disclosed embodiments may include a significant number of such small particles (less than 40 nm) that are not counted by DLS and therefore do not contribute to the average particles size.

Laser diffraction techniques may also optionally be used to characterize particle size distribution. Those of ordinary skill in the art will readily appreciate that laser diffraction techniques also tend to under count small particles (e.g., less than 40 nm in the disclosed embodiments). Laser diffraction measurements may be made, for example, using the Horiba LA-960 using a relative refractive index of 1.7. From the distribution obtained with laser diffraction measurements, various parameters may be obtained, for example, including D10, D50, D90, D99 and the dispersion index (defined below). Based on laser diffraction measurements, the abrasive particles may include a median diameter (D50) in a range from about 100 nm to about 700 nm (e.g., from about 100 nm to about 200 nm). For example, D50 may be in a range from about 100 nm to about 150 nm or from about 150 nm to about 200 nm. D50 is the median diameter determined from a distribution obtained by laser diffraction.

The cubiform ceria abrasive particles may optionally have a D10 in a range from about 80 nm to about 400 nm (e.g., from about 80 nm to about 250 nm, from about 80 nm to about 150 nm, or from about 100 nm to about 130 nm). It will be understood that D10 represents the particle diameter obtained by laser diffraction for which 10% of the particles have a diameter of less than D10.

The cubiform ceria abrasive particles may optionally have a D90 in a range from about 150 nm to about 1200 nm (e.g., from about 150 nm to about 1000 nm, from about 150 to about 750 nm, from about 150 to about 500 nm, from about 150 to about 300 nm, or from about 200 nm to about 300 nm). D90 represents the particle diameter obtained by laser diffraction for which 90% of the particles have a diameter of less than D90. Abrasive particles having undergone mechanical deagglomeration may have a D90 less than about 300 nm.

The cubiform ceria abrasive particles may optionally exhibit a low dispersion index. The "dispersion index" is defined by the following formula dispersion index=(D90−D10)/2·D50. The dispersion index may be less than about 0.60, for example (less than about 0.5, less than about 0.4, or less than about 0.30). Abrasive particles having undergone mechanical deagglomeration may have a dispersion index less than about 0.30. Moreover, D90/D50 may be in a range from about 1.3 to about 2 for particles having undergone mechanical deagglomeration.

The cubiform ceria abrasive particles may optionally have a D99 in a range from about 150 nm to about 3000 nm (e.g., from about 200 nm to about 2000 nm, from about 200 nm to about 1800 nm, from about 200 to about 1200, from about 200 to about 900, from about 200 nm to about 600 nm, from about 200 to about 500 nm, or from about 200 to about 400 nm). Abrasive particles having undergone mechanical deagglomeration may have a D99 less than about 600 nm (e.g., less than about 500 or less than about 400). D99 represents the particle diameter obtained by laser diffraction for which 99% of the particles have a diameter of less than D99.

The abrasive particles may be prepared using substantially any suitable methodology for producing cubiform ceria abrasive particles. The disclosed embodiments are directed to chemical mechanical polishing compositions including such abrasive particles and to methods for polishing substrates using such abrasive particles and are not limited to any particular methods for producing the particles. In certain embodiments, the cubiform ceria abrasive particles may be prepared by precipitating cerium nitrates (and optionally other nitrates when a doped ceria abrasive is prepared). The precipitated material may then be grown in a specific temperature and pressure regime to promote growth of cubiform ceria abrasive particles. These particles may then be cleaned and deagglomerated. A dispersion of the cubiform ceria abrasive particles may then be prepared and used to formulate the inventive chemical mechanical compositions.

In one advantageous embodiment cubiform cerium lanthanum oxide abrasive particles may be prepared by precipitating nitrates of cerium and of lanthanum. One such preparation method includes the following steps:

(i) Mixing, under an inert atmosphere, an aqueous cerium nitrate solution and an aqueous base.
(ii) Heating the mixture obtained in (i) under an inert atmosphere.
(iii) Optionally acidifying the heat treated mixture obtained in (ii).
(iv) Washing with water the solid material obtained in (ii) or (iii).
(v) Mechanically treating the solid material obtained in (iv) to deagglomerate the ceria particles.

The cerium nitrate solution used in step (i) of the above methodology may be prepared by mixing aqueous solutions of cerium nitrates and lanthanum nitrates. The aqueous solution comprises $Ce^{III}$, $Ce^{IV}$ and $La^{III}$ may be characterized by a $Ce^{IV}$ to total Ce molar ratio between about 1/(500,000) and about 1/(4,000). In one example embodiment the molar ratio may be between about 1/(100,000) and about 1/(90,000). It is generally advantageous to use salts and ingredients of a high purity, for example, having a purities of at least 99.5 weight percent or even 99.9 weight percent.

Step (i) includes mixing/reacting the aqueous cerium nitrate solution with an aqueous base. Bases of the hydroxide type may be advantageous, for example, including alkali metal or alkaline earth metal hydroxides and aqueous ammonia. Secondary, tertiary or quaternary amines may also be used. The aqueous solution of the base may also be degassed (deoxygenated) beforehand by bubbling with an inert gas. The mixing may be implemented by introducing the aqueous cerium nitrate solution into the aqueous base and is advantageously carried out under an inert atmosphere, for example, in a closed reactor or in a semi-closed reactor with inert gas (e.g., nitrogen or argon) purging. The mixing may also be carried out with stirring. The molar ratio of base to (Ce+La) may be between about 8.0 and about 30.0 (e.g., greater than about 9.0). Step (i) may further be carried out at a temperature between about 5 degrees C. and about 50 degrees C., for example, between about 20 degrees C. and 25 degrees C.

Step (ii) includes heating the mixture obtained at the end of the preceding step and may include a heating sub-step and an aging sub-step. The heating sub-step may include heating the mixture to a temperature in range from about 75 degrees C. to about 95 degrees C., for example, from about 85 degrees C. to about 90 degrees C. The aging sub-step may include maintaining (holding) the mixture at the temperature for a duration in a range from about 2 hours to about 20 hours. In general the aging time decreases with increasing temperature. Step (ii) may also be carried out under an inert atmosphere and stirring as described above for step (i).

In step (iii), the mixture obtained at the end of step (ii) may optionally be acidified, for example, using nitric acid. The heat treated reaction mixture may be acidified, for example, to a pH lower than about 3.0 (e.g., in a range from about 1.5 to about 2.5).

In step (iv), the solid material obtained in step (ii) or (iii) may be washed with water, (e.g., deionized water). The washing may be used to decrease residual nitrates in the final dispersion and to obtain a targeted conductivity. The washing may include filtering the solid from the mixture and redispersing the solid in water. Filtration and redispersion may be performed several times if necessary.

In step (v), the washed solid material obtained in (iv) may optionally be mechanically treated to deagglomerate or partially deagglomerate the ceria abrasive particles. Mechanical treatment may include, for example, double jet treatment or ultrasonic deagglomeration and usually results in a narrow particle size distribution and to a reduction of the number of large agglomerated particles.

After step (iv) or (v), the solid material may be dried to obtain the cerium-based particles in the powder form. The powder may be redispersed by adding water or a mixture of water and of a miscible liquid organic compound to obtain a dispersion of the cerium-based particles in a liquid medium. The liquid medium may be water or a mixture of water and of a water-miscible organic liquid. The water-miscible organic liquid may, for example, include an alcohol such as isopropyl alcohol, ethanol, 1-propanol, methanol, 1-hexanol; a ketone such as acetone, diacetone alcohol, methyl ethyl ketone; an ester such ethyl formate, propyl formate, ethyl acetate, methyl acetate, methyl lactate, butyl lactate, ethyl lactate. The proportion of water to organic liquid may be between 80 to 20 and 99 to 1 parts by weight. Moreover, the dispersion may include from about 1 weight percent to about 40 weight percent of the cerium-based particles, e.g., between about 10 weight percent and about 35 weight percent. The dispersion may also have a conductivity less than about 300 μS/cm, for example, less than about 150 more particularly lower than 150 μS/cm or less than about 100 μS/cm.

The polishing composition may include substantially any suitable amount of the cubiform ceria abrasive particles. For example, the polishing composition may include about 0.001 weight percent or more of the cubiform ceria abrasive particles at point of use (e.g., about 0.005 weight percent or more, about 0.01 weight percent or more, about 0.02 weight percent or more, about 0.05 weight percent or more, or about 0.1 weight percent or more). The polishing composition may include about 5 weight percent or less of the cubiform ceria abrasive particles at point of use (e.g., about 2 weight percent or less, about 1.5 weight percent or less, or about 1 weight percent or less). It will be understood that the cubiform ceria abrasive particles may be present in the polishing composition at a concentration bounded by any two of the aforementioned endpoints. For example, the concentration of cubiform ceria abrasive particles in the polishing composition may be in a range from about 0.001 weight percent to about 5 weight percent at point of use (e.g., from about 0.01 weight percent to about 2 weight percent, from about 0.05 weight percent to about 1.5 weight percent, or from about 0.1 weight percent to about 1 weight percent).

An aqueous liquid carrier is used to facilitate the application of the abrasive and any optional chemical additives to the surface of the substrate to be polished (e.g., planarized). By aqueous it is meant that the liquid carrier is made up of at least 50 wt. % water (e.g., deionized water). The liquid carrier may include other suitable non-aqueous carriers, for example, including lower alcohols (e.g., methanol, ethanol, etc.) and ethers (e.g., dioxane, tetrahydrofuran, etc.). Preferably, the liquid carrier consists essentially of or consists of water, and more preferably deionized water.

The polishing composition is generally mildly acidic, neutral, or alkaline having a pH in a range from about 4 to about 11. For example, the polishing composition may have a pH in a range from about 5 to about 10. In one embodiment, the polishing composition is mildly acidic having a pH in a range from about 4 to about 7 (e.g., from about 4 to about 6, or from about 4.5 to about 6). For example, in such a mildly acidic embodiment, the pH may be about 5. In another embodiment, the polishing composition is alkaline having a pH in a range from about 8 to about 11 (e.g., from about 9 to about 11, from about 9 to about 10.5, or from about 9.5 to 10.5). For example, in such an alkaline embodiment, the pH may be about 10. In still another embodiment the polishing composition is neutral having a pH in a range from about 6 to about 8 (e.g., from about 6.5 to about 7.5).

The polishing composition may further include a chemical additive that associates with a surface of the cubiform ceria abrasive particles and/or with a surface of the polished substrate (e.g., via electrostatic interaction and/or hydrogen bonding). The chemical additive may be, for example, a dispersant, a rheology agent, a polishing rate accelerator, a polishing rate inhibitor, or a selectivity promoter (to improve the removal rate ratio of one material to another). Preferred chemical additives include anionic compounds (such as anionic polymers and anionic surfactants) and nonionic compounds such as nonionic polymers.

Suitable anionic compounds may include anionic polymers and non-polymeric anionic compounds (such as surfactants). The anionic compounds may include water-soluble polyelectrolytes, polyanions, polyacids, polyacrylates, poly(vinyl acids), anionic detergents, alkyl or alkyl ether sulfonates and sulfates, alkyl or alkyl ether phosphonates and phosphates, and alkyl or alkyl ether carboxylates.

The anionic polymers may be homopolymers or copolymers and include monomer units selected from carboxylic acid groups, sulfate or sulfonic acid groups, and phosphate or phosphonic acid groups. For example suitable anionic polymers may include poly(acrylic acid), poly(methacrylic acid), poly(maleic acid), poly(vinyl sulfonic acid), poly (styrene sulfonic acid), poly(vinyl sulfate), poly(vinyl phosphoric acid), poly(2-acrylamido-2-methyl-1-propanesulfonic acid), and combinations thereof. The anionic compound may also include sodium and ammonium salt versions thereof of the aforementioned compounds (e.g., poly(methacrylic acid, sodium salt)). The anionic compound may also include derivatives of the aforementioned compounds, for example, in which one or more alkyl groups or other functional groups has been included in the compound. For example, poly(methacrylic acid) is a derivative of poly (acrylic acid).

Example anionic polymers may further include copolymers including one or more of acrylic acid, methacrylic acid, maleic acid, vinyl sulfonic acid, sulfate, styrene sulfonic acid and phosphate monomers. Such anionic copolymers may optionally include one or more nonionic monomers, for example, including (but not limited to) methacrylate esters, vinyl acetate, acrylamide and N-vinylpyrrolidone. Example copolymers may include poly(methyl methacrylate-co-methacrylic acid), poly(acrylamide-co-acrylic acid), poly(4-styrenesulfonic acid-co-maleic acid) and poly(acrylic acid-co-maleic acid).

Non-polymeric anionic compounds may include alkyl or alkyl aryl sulfates, alkyl or alkyl aryl sulfonates, alkyl or alkyl aryl phosphates, alkyl or alkyl aryl carboxylates, and combination thereof. Example anionic compounds include dodecylbenzene sulfonic acid, ammonium lauryl sulfate, 1-decanesulfonate, stearic acid, dihexadecyl phosphate, dodecylphosphonic acid and combinations thereof, ammonium and sodium salt versions thereof, and derivatives thereof.

Suitable nonionic compounds may include water soluble nonionic polymers and non-polymeric nonionic compounds. The nonionic compounds may include water-soluble polyethers, polyether glycols, alcohol ethoxylates, polyoxyalkylene alkyl ethers, polyesters, vinylacrylates, and combinations thereof.

Nonionic polymers may be homopolymers or copolymers and may include substantially any suitable nonionic monomer units. Example nonionic polymers include polyvinyl acetate, polyvinyl alcohol, polyvinyl acetal, polyvinyl formal, polyvinyl butyral, polyvinylpyrrolidone, poly(vinyl phenyl ketone), poly(vinylpyridine), poly(vinylimidazole), poly(acrylamide), polyacrolein, poly(methyl methacrylic acid), polyethylene, polyoxyethylene lauryl ether, polyhydroxyethylmethacrylate, poly(ethylene glycol) monolaurate, poly(ethylene glycol) monooleate, poly(ethylene glycol) distearate, and copolymers that include one or more of the aforementioned monomer units. Example copolymers include poly(vinyl acetate-co-methyl methacrylate), poly (vinylpyrrolidone-co-vinyl acetate), poly(ethylene-co-vinyl acetate).

The nonionic compound may also include derivatives of the aforementioned compounds, for example, in which one or more alkyl groups or other functional groups has been included in the compound. For example, poly(N-isopropylacrylamide) is a derivative of poly(acrylamide).

The polishing composition may include substantially any suitable amount of the anionic and/or nonionic compounds. For example, the polishing composition may include about 100 ppm by weight (0.01 weight percent) or more of the anionic and/or nonionic compound at point of use (e.g., about 250 ppm by weight or more, about 500 ppm by weight or more, about 750 ppm by weight or more, or about 1000 ppm by weight (0.1 weight percent) or more). The polishing composition may include about 2 weight percent or less of the anionic and/or nonionic compound at point of use (e.g., about 1.5 weight percent or less, about 1.2 weight percent or less, or about 1 weight percent or less). It will be understood that the anionic and/or nonionic compound may be present in the polishing composition at a concentration bounded by any two of the aforementioned endpoints. For example, the concentration of anionic and/or nonionic compound in the polishing composition may be in a range from about 0.01 weight percent to about 2 weight percent at point of use (e.g., from about 0.05 weight percent to about 1.5 weight percent, or from about 0.1 weight percent to about 1 weight percent).

The polishing composition may further include other optional additives, for example including, secondary polishing rate accelerators or inhibitors, dispersants, conditioners, scale inhibitors, chelating agents, stabilizers, pH adjusting and buffering compounds, and biocides. Such additives are purely optional. The disclosed embodiments are not so limited and do not require the use of any one or more of such additives.

The polishing composition may optionally further include a biocide. The biocide may include substantially any suitable biocide, for example an isothiazolinone biocide such as a methylisothiazolinone or a benzisothiazolone. The amount of biocide in the polishing composition typically is in a range from about 1 ppm by weight to about 100 ppm by weight at point of use, for example from about 5 ppm by weight to about 75 ppm by weight.

The polishing composition may be prepared using any suitable techniques, many of which are known to those skilled in the art. The polishing composition may be prepared in a batch or continuous process. Generally, the polishing composition may be prepared by combining the components thereof in any order. The term "component" as used herein includes the individual ingredients (e.g., the abrasive particles, the anionic and/or nonionic compound, and any optional additives). For example, the anionic and/or nonionic compound may be added to the aqueous carrier (e.g., water) at the desired concentration(s). The pH may then be adjusted (as desired) and the cubiform ceria abrasive added at the desired concentration to form the polishing composition. The polishing composition may be prepared prior to use, with one or more components added to the polishing composition just before use (e.g., within about 1 minute before use, or within about 1 hour before use, or within about 1 or about 7 days before use). The polishing composition also may also be prepared by mixing the components at the surface of the substrate during the polishing operation (e.g., on the polishing pad).

In certain embodiments, the polishing composition may be provided as a "two-pack" system. For example, a first pack may include the cubiform ceria abrasive and other optional components and a second pack may include the anionic and/or nonionic compound and still other optional components. The first and second packs may be shipped separately and combined prior to polishing (e.g., within one hour or one day of polishing) or on the polishing pad during the CMP operation.

The polishing composition of the invention may be provided as a concentrate which is intended to be diluted with an appropriate amount of water prior to use. In such an embodiment, the polishing composition concentrate may include the cubiform ceria abrasive particles and other components described above in amounts such that, upon dilution of the concentrate with an appropriate amount of water each component of the polishing composition will be present in the polishing composition in an amount within the appropriate range recited above for each component. For example, the cubiform ceria abrasive particles, the anionic and/or nonionic compound, and other optional additives may each be present in the polishing composition in an amount that is about 3 times (e.g., about 4 times, about 5 times, about 6 times, about 7 times, about 8 times, about 10 times, about 15 times, about 20 times, or about 25 times) greater than the point of use concentration recited above for each component so that, when the concentrate is diluted with an equal volume of (e.g., 2 equal volumes of water, 3 equal volumes of water, 4 equal volumes of water, 5 equal volumes of water, 5 equal volumes of water, 6 equal volumes of water, 7 equal volumes of water, 9 equal volumes of water, 14 equal volumes of water, 19 equal volumes of water, or 24 equal volumes of water), each component will be present in the polishing composition in an amount within the ranges set forth above for each component.

In embodiments in which the polishing composition is provided as a two-pack system, either or both of the packs may be provided as a concentrate and require dilution prior to mixing with the other pack. For example, in one embodiment, the first pack is provided as a concentrate such that it includes cubiform ceria abrasive particles at a concentration that is about 3 times (e.g., about 5 times, about 8 times, about 10 times, about 15 times, or about 20 times) greater than the point of use concentrations recited above. The concentrated first pack may be mixed with a suitable quantity of water prior to combining with the second pack. Likewise, the second pack may be provided as a concentrate such that it includes the anionic compound or the nonionic compound at concentrations that are about 3 times (e.g., about 5 times, about 8 times, about 10 times, about 15 times, or about 20 times) greater than the point of use concentrations recited above. In such embodiments, the concentrated second pack may be mixed with a suitable quantity of water prior to combining with the first pack. In certain embodiments, both the first and second packs may be diluted with water prior to combining. The disclosed embodiments are not limited in these regards.

The polishing method of the invention is particularly suited for use in conjunction with a chemical mechanical polishing (CMP) apparatus, for example including a platen and a pad affixed thereto. As is known to those of ordinary skill in the art, polishing of the substrate takes place when the substrate is placed in contact with the polishing pad and the polishing composition of the invention and then the polishing pad and the substrate move relative to one another so as to abrade at least a portion of the substrate. The inventive method includes providing the inventive composition described above, contacting a substrate (e.g., a wafer) with the inventive composition, moving the polishing composition relative to the substrate, and abrading the substrate to remove a portion of a silicon oxide material from the substrate and thereby polish the substrate.

The substrate generally includes a patterned dielectric layer, many of which are well known, including various forms of silicon oxide and silicon oxide-based dielectric materials. For example, a dielectric material that includes silicon oxide or silicon oxide-based dielectric layer may comprise, consist of, or consist essentially of any one or more of: tetraethylorthosilicate (TEOS), high density plasma (HDP) oxide, phosphosilicate glass (PSG), borophosphosilicate glass (BPSG), high aspect ratio process (HARP) oxide, spin on dielectric (SOD) oxide, chemical vapor deposition (CVD) oxide, plasma-enhanced tetraethyl ortho silicate (PE-TEOS), thermal oxide, or undoped silicate glass.

The polishing composition desirably exhibits a high removal rate when polishing a substrate including a silicon oxide material. For example, when polishing silicon wafers comprising high density plasma (HDP) oxides and/or plasma-enhanced tetraethyl ortho silicate (PETEOS), spin-on-glass (SOG), and/or tetraethyl orthosilicate (TEOS), the polishing composition desirably exhibits a silicon oxide removal rate of about 1000 Å/min or higher (e.g., about 2000 Å/min or higher, about 2,500 Å/min or higher, about 3,000 Å/min or higher, about 3,500 Å/min or higher, about 4000 Å/min or higher, about 4500 Å/min or higher, or about 5000 Å/min or higher).

The polishing composition may be further suitable for polishing substrates including both silicon oxide and silicon nitride materials. In certain embodiments, it may be desirable for the removal rate of silicon oxide material to exceed the removal rate of silicon nitride material (i.e., to have a silicon oxide to silicon nitride removal rate selectivity greater than 1). In example embodiments, the polishing composition may advantageously exhibit a silicon oxide to silicon nitride removal rate selectivity of greater than 2 (e.g., greater than 3, greater than 5, greater than 7, greater than 10, greater than 15, or even greater than 20 in certain embodiments).

In other applications in which the polishing composition is used to polish both silicon oxide and silicon nitride materials it may be desirable for the removal rate of silicon nitride material to exceed the removal rate of silicon oxide material. In example embodiments, the polishing composition may advantageously exhibit a silicon nitride to silicon oxide removal rate selectivity of greater than 1 (i.e., a silicon oxide to silicon nitride selectivity of less than 1).

The polishing composition may be further suitable for polishing substrates including both silicon oxide and polysilicon materials. In certain embodiments, it may be desirable for the removal rate of silicon oxide material to exceed the removal rate of polysilicon (i.e., to have a silicon oxide to polysilicon removal rate selectivity greater than 1). In example embodiments, the polishing composition may advantageously exhibit a silicon oxide to polysilicon removal rate selectivity of greater than 2 (e.g., greater than 3, greater than 5, greater than 7, greater than 10, greater than 15, or even greater than 20 in certain embodiments).

The inventive method desirably planarizes a patterned dielectric, for example, via reducing an initial step height between raised areas (having initial height) and trenches (having initial trench thickness). To accomplish this planarization effectively and efficiently, the inventive method desirably has a high removal rate of raised areas (of active pattern dielectric material) and a comparatively lower removal rate of dielectric material of trenches. As polishing progresses, the wafer is planarized by reducing the step height between the raised areas and the trenches.

It will be understood that the disclosure includes numerous embodiments. These embodiments include, but are not limited to, the following embodiments.

In a first embodiment a chemical-mechanical polishing composition including: a liquid carrier; cubiform ceria abrasive particles dispersed in the liquid carrier; and at least one of an anionic compound and a nonionic compound.

A second embodiment may include the first embodiment wherein the cubiform ceria abrasive particles comprise a mixture of cerium oxide and lanthanum oxide.

A third embodiment may include any one of the first through the second embodiments wherein the cubiform ceria abrasive particles have a molar ratio of lanthanum to lanthanum plus cerium in a range from about 1 to about 15 percent.

A fourth embodiment may include any one of the first through the third embodiments wherein the cubiform ceria abrasive particles have a BET surface area in a range from about 3 $m^2/g$ to about 14 $m^2/g$.

A fifth embodiment may include any one of the first through the fourth embodiments wherein the cubiform ceria abrasive particles have an average particle size in a range from about 50 to about 500 nm.

A sixth embodiment may include any one of the first through the fifth embodiments, comprising from about 0.01 to about 2 weight percent of the cubiform ceria abrasive particles at point of use.

A seventh embodiment may include any one of the first through the sixth embodiments wherein the anionic compound comprises a water-soluble polyelectrolyte, polyanions, polyacids, polyacrylates, poly(vinyl acid), anionic detergents, alkyl or alkyl ether sulfonates and sulfates, alkyl or alkyl ether phosphonates and phosphates, and alkyl or alkyl ether carboxylates.

An eighth embodiment may include any one of the first through the seventh embodiments wherein the anionic compound is an anionic homopolymer or copolymer and comprises at least one monomer unit selected from acrylic acid, methacrylic acid, maleic acid, vinyl sulfonic acid, sulfate, styrene sulfonic acid and phosphate.

A ninth embodiment may include any one of the first through the eighth embodiments wherein the anionic compound comprises poly(acrylic acid), poly(methacrylic acid), poly(maleic acid), poly(vinyl sulfonic acid), poly(styrene sulfonic acid), poly(vinyl sulfate), poly(2-acrylamido-2-methyl-1-propanesulfonic acid), poly(vinyl phosphoric acid), poly(methyl methacrylate-co-methacrylic acid, poly (acrylic acid-co-maleic acid), poly(acrylamide-co-acrylic acid), poly(4-styrenesulfonic acid-co-maleic acid), or a combinations thereof.

A tenth embodiment may include any one of the first through the ninth embodiments wherein the anionic compound is a non-polymeric compound and comprises an alkyl or alkyl aryl sulfate, an alkyl or alkyl aryl sulfonate, an alkyl or alkyl aryl phosphate, an alkyl or alkyl aryl carboxylate, or a combination thereof.

An eleventh embodiment may include any one of the first through the tenth embodiments wherein the anionic compound is dodecylbenzene sulfonic acid, ammonium lauryl sulfate, stearic acid, dihexaphosphate, dodecylphosphoric acid, 1-decanesulfonate, a derivative thereof, an ammonium or sodium salt thereof, or a combination thereof.

A twelfth embodiment may include any one of the first through the Eleventh embodiments wherein the nonionic compound is a nonionic polymer comprising water-soluble polyethers, polyether glycols, alcohol ethoxylates, polyoxyalkylene alkyl ethers, polyesters, vinyl acrylates, or a combination thereof.

A thirteenth embodiment may include any one of the first through the twelfth embodiments wherein the nonionic compound is an nonionic homopolymer or copolymer and comprises polyvinyl acetate, polyvinyl alcohol, polyvinyl acetal, polyvinyl formal, polyvinyl butyral, polyvinylpyrrolidone, poly(vinyl phenyl ketone), poly(vinylpyridine), poly(vinylimidazole), poly(acrylamide), polyacrolein, poly (methyl methacrylic acid), polyethylene, polyoxyethylene lauryl ether, polyhydroxyethylmethacrylate, poly(ethylene glycol) monolaurate, poly(ethylene glycol) monooleate, poly(ethylene glycol) distearate, poly(vinyl acetate-co-methyl methacrylate), poly(vinylpyrrolidone-co-vinyl acetate), poly(ethylene-co-vinyl acetate), and combinations thereof.

A fourteenth embodiment may include any one of the first through the thirteenth embodiments, comprising from about 0.01 weight percent to about 2 weight percent of the anionic compound or the nonionic compound at point of use.

A fifteenth embodiment may include any one of the first through the fourteenth embodiments, having a pH in a range from about 4 to about 6 or from about 9 to about 11.

A sixteenth embodiment may include any one of the first through the fifteenth embodiments, comprising from about 0.01 to about 2 weight percent of the cubiform ceria abrasive particles at point of use, wherein: (i) the cubiform ceria abrasive particles comprise a mixture of cerium oxide and lanthanum oxide and have an average particle size in a range from about 50 to about 500 nm; (ii) the anionic compound comprises poly(acrylic acid); and (iii) the composition has a pH in a range from about 4 to about 6.

A seventeenth embodiment may include any one of the first through the sixteenth embodiments, comprising from about 0.01 to about 2 weight percent of the cubiform ceria abrasive particles at point of use, wherein: (i) the cubiform ceria abrasive particles comprise a mixture of cerium oxide and lanthanum oxide and have an average particle size in a range from about 50 to about 500 nm; (ii) the nonionic compound comprises polyvinylpyrrolidone, poly(vinylpyrrolidone-co-vinyl acetate), or a mixture thereof; and (iii) the composition has a pH in a range from about 9 to about 11.

An eighteenth embodiment may include any one of the first through the seventeenth embodiments, comprising from about 0.01 to about 2 weight percent of the cubiform ceria abrasive particles at point of use, wherein: (i) the cubiform ceria abrasive particles comprise a mixture of cerium oxide and lanthanum oxide and have an average particle size in a range from about 50 to about 500 nm; (ii) the anionic compound comprises poly(methacrylic acid), poly(vinyl sulfonic acid), poly(styrene sulfonic acid), poly(2-acrylamido-2-methyl-1-propanesulfonic acid), poly(4-styrenesulfonic acid-co-maleic acid), dodecylbenzene sulfonic acid, or a mixture thereof; and (iii) the composition has a pH in a range from about 9 to about 11.

A nineteenth embodiment includes a method of chemical mechanical polishing a substrate including a silicon oxide dielectric material. The method includes: (a) providing any one of the first through the eighteenth polishing composition embodiments; (b) contacting the substrate with said provided polishing composition; (c) moving said polishing composition relative to the substrate; and (d) abrading the substrate to remove a portion of the silicon oxide dielectric material from the substrate and thereby polish the substrate.

A twentieth embodiment may include the nineteenth embodiment wherein: (i) the polishing composition comprises from about 0.01 to about 2 weight percent of the cubiform ceria abrasive particles at point of use, the cubiform ceria abrasive particles including a mixture of cerium oxide and lanthanum oxide and having an average particle size in a range from about 50 to about 500 nm; (ii) the anionic compound comprises poly(acrylic acid); (iii) the polishing composition has a pH in a range from about 4 to about 6; and (iv) a removal rate of the silicon oxide dielectric material is at least 1000 Å/min while abrading in (d).

A twenty-first embodiment may include the twentieth embodiment wherein the substrate further comprises at least one of a silicon nitride material and a polysilicon material; and a removal rate selectivity of the silicon oxide dielectric material to the silicon nitride material or the silicon oxide dielectric material to the polysilicon material is greater than about 10:1 in (d).

A twenty-second embodiment may include the nineteenth embodiment wherein: (i) the polishing composition comprises from about 0.01 to about 2 weight percent of the cubiform ceria abrasive particles at point of use, the cubiform ceria abrasive particles including a mixture of cerium oxide and lanthanum oxide and having an average particle size in a range from about 50 to about 500 nm; (ii) the nonionic compound comprises polyvinylpyrrolidone; (iii) the polishing composition has a pH in a range from about 9 to about 11; (iv) the substrate further comprises a silicon nitride material; and (v) a removal rate selectivity of the silicon oxide dielectric material to the silicon nitride material is less than about 1:1 in (d).

A twenty-third embodiment may include the nineteenth embodiment wherein: (i) the polishing composition comprises from about 0.01 to about 2 weight percent of the cubiform ceria abrasive particles at point of use, the cubiform ceria abrasive particles including a mixture of cerium oxide and lanthanum oxide and having an average particle size in a range from about 50 to about 500 nm; (ii) the anionic compound comprises poly(methacrylic acid), poly(vinyl sulfonic acid), poly(styrene sulfonic acid), poly(2-acrylamido-2-methyl-1-propanesulfonic acid), poly(4-styrenesulfonic acid-co-maleic acid), dodecylbenzene sulfonic acid, or a mixture thereof; (iii) the composition has a pH in a range from about 9 to about 11; (iv) a removal rate of the silicon oxide dielectric material is at least 3000 Å/min while abrading in (d).

A twenty-fourth embodiment may include the twenty-third embodiment wherein: the substrate further comprises a silicon nitride material; and a removal rate selectivity of the silicon oxide dielectric material to the silicon nitride material is less than about 10:1 in (d).

A twenty-fifth embodiment may include any one of the nineteenth through the twenty-fourth embodiments said providing any one of the polishing compositions of claims 1-17 comprises providing a polishing concentrate and diluting the polishing concentrate with at least one part water to one part of the polishing concentrate.

The following examples further illustrate the invention but, of course, should not be construed as in any way limiting its scope. Various substrates were polished using an Applied Materials Mirra® polishing tool (available from Applied Materials, Inc.). Blanket wafers were polished for 60 seconds on the Mirra® at a platen speed of 100 rpm, a head speed of 85 rpm, a downforce of 3 psi, and a slurry flow rate of 150 ml/min. The wafers were polished on a NexPlanar® E6088 pad (available from Cabot Microelectronics Corporation) with in-situ conditioning using a Saesol DS8051 conditioner at 6 pounds downforce.

Blanket tetraethylorthosilicate (TEOS), SiN, and polysilicon wafers were polished in the Examples that follow. The TEOS wafers were obtained from WRS Materials and included a 20 kA TEOS layer. The SiN wafers included both SiN PE wafers and SiN LP wafers. The SiN PE were obtained from Advantec and included a 5 kA PE SiN layer. The SiN LP wafers were obtained from Novati and included a 3 kA LP SiN layer. The polysilicon wafers were obtained from WRS Materials and included a 10 kA polySi layer.

Example 1

A stock cerium oxide dispersion was prepared as follows. A cerium nitrate solution was prepared by combining 13.1 kg of a 3 M trivalent cerium(III) nitrate solution, 0.3 kg of a 3 M lanthanum nitrate solution, 2.0 kg of a 68% nitric acid ($HNO_3$) solution, 0.5 kg deionized water, and cerium(IV) nitrate at a molar ratio of cerium(IV) to cerium (total) equal to 0.000055. The cerium nitrate solution was then degassed with agitation and nitrogen bubbling in a 20 L vessel.

An aqueous ammonia solution was prepared by combining 75 kg of deionized water and a solution of 13.1 kg of 25% aqueous ammonia (such that the molar ratio of $NH_4OH$ in the aqueous ammonia solution to the total cerium and lanthanum in the cerium nitrate solution was 9.0). The aqueous ammonia solution was then degassed with agitation and nitrogen bubbling in a 100 L vessel jacketed reactor.

The cerium nitrate solution was then added, at ambient temperature, to the aqueous ammonia solution with the same agitation under nitrogen purging. The temperature of the reaction mixture was then increased to 80° C. and held at that temperature for 18 hours. The reaction mixture was then left to cool and upon cooling was acidified to pH 2 by adding 68% nitric acid.

The reaction mixture was then filtrated and washed with deionized water. The washing was repeated when the conductivity of the washing solution was less than 0.04 mS/cm. Deionized water was added to adjust the final cerium oxide concentration to 10 weight percent. The cubiform ceria abrasive particles included 2.5 mole percent lanthanum oxide and 97.5 mole percent cerium oxide.

The BET specific surface area was determined by nitrogen adsorption to be 11.3 $m^2$ per gram. The average particle size was 102 nm as measured by Horiba 960 and 140 nm as measured by the Malvern Zetasizer.

Example 2

Two polishing compositions were tested to evaluate TEOS, SiN-PE, SiN-LP, and PolySi polishing rates. Each composition included poly(acrylic acid) (MW about 5000) and ceria at pH 4.5. Composition 2A included a control ceria (wet process ceria HC60™ commercially available from Rhodia) while composition 2B included the cubiform ceria described above in Example 1. Point of use concentrations are as indicated in Table 1A.

TABLE 1A

| Composition | Ceria | Poly(acrylic acid) | pH |
|---|---|---|---|
| 2A | 0.375 wt % Control | 0.25 wt % | 4.5 |
| 2B | 0.375 wt % Cubiform | 0.25 wt % | 4.5 |

Blanket TEOS, SiN-PE, SiN-LP, and PolySi wafers were polished for 60 seconds on a Mirra® tool at the conditions listed above. Polishing results are shown in Table 1B. All removal rates (RR) are listed in angstroms per minute (Å/min). TEOS:SiN-PE, TEOS:SiN-LP and TEOS:PolySi selectivies are listed in Table 1C.

TABLE 1B

| Composition | TEOS RR | SiN-PE RR | SiN-LP RR | PolySi RR |
|---|---|---|---|---|
| 2A | 745 | 140 | 84 | 80 |
| 2B | 2254 | 151 | 90 | 84 |

TABLE 1C

| Composition | TEOS:SiN-PE | TEOS:SiN-LP | TEOS:PolySi |
|---|---|---|---|
| 2A | 5 | 9 | 9 |
| 2B | 15 | 25 | 27 |

As is readily apparent from the results set forth in Tables 1B and 1C, composition 2B (including the cubiform ceria abrasive) had a TEOS removal rate of 3× that of composition 2A (including the control ceria), while the silicon nitride and polysilicon removal rates were similar. As a result, composition 2B exhibited TEOS to SiN and TEOS to polysilicon selectivities about a factor 3× greater than composition 2A.

Example 3

Two polishing compositions were tested to evaluate TEOS, SiN-PE, SiN-LP, and PolySi polishing rates. Each composition included poly(methacrylic acid) sodium salt (MW about 9500 g/mol) and ceria at pH 10. Composition 3A included the control ceria described above in Example 2 while composition 3B included the cubiform ceria described above in Example 1. Point of use concentrations are as indicated in Table 2A.

TABLE 2A

| Composition | Ceria | Poly(methacrylic acid) | pH |
|---|---|---|---|
| 3A | 0.375 wt % Control | 0.25 wt % | 10 |
| 3B | 0.375 wt % Cubiform | 0.25 wt % | 10 |

Blanket TEOS, SiN-PE, SiN-LP, and PolySi wafers were polished for 60 seconds on a Mirra® tool at the conditions listed above. Polishing results are shown in Table 2B. All removal rates (RR) are listed in angstroms per minute (Å/min). TEOS:SiN-PE, TEOS:SiN-LP and TEOS:PolySi selectivies are listed in Table 2C.

TABLE 2B

| Composition | TEOS RR | SiN-PE RR | SiN-LP RR | PolySi RR |
|---|---|---|---|---|
| 3A | 1903 | 259 | 328 | 2084 |
| 3B | 3774 | 553 | 658 | 2231 |

TABLE 2C

| Composition | TEOS:SiN-PE | TEOS:SiN-LP | TEOS:PolySi |
|---|---|---|---|
| 3A | 7 | 6 | 0.9 |
| 3B | 7 | 6 | 1.7 |

As is readily apparent from the results set forth in Tables 2B and 2C, composition 3B (including the cubiform ceria abrasive) unexpectedly had TEOS and SiN removal rates about 2× greater than that of composition 3A (including the control ceria), while the polysilicon removal rates were similar. As a result composition 3B exhibited both greater removal rates and a 2× increase in TEOS to polysilicon selectivity as compared to composition 3A.

Example 4

Two polishing compositions were tested to evaluate TEOS, SiN-PE, SiN-LP, and PolySi polishing rates. Each composition included poly(vinylsulfonic acid) and ceria at pH 10. Composition 4A included the control ceria described above in Example 2 while composition 4B included the cubiform ceria described above in Example 1. Point of use concentrations are as indicated in Table 3A.

TABLE 3A

| Composition | Ceria | Poly(vinylsulfonic acid) | pH |
|---|---|---|---|
| 4A | 0.375 wt % Control | 0.25 wt % | 10 |
| 4B | 0.375 wt % Cubiform | 0.25 wt % | 10 |

Blanket TEOS, SiN-PE, SiN-LP, and PolySi wafers were polished for 60 seconds on a Mirra® tool at the conditions listed above. Polishing results are shown in Table 3B. All removal rates (RR) are listed in angstroms per minute (Å/min). TEOS:SiN-PE, TEOS:SiN-LP and TEOS:PolySi selectivies are listed in Table 3C.

TABLE 3B

| Composition | TEOS RR | SiN-PE RR | SiN-LP RR | PolySi RR |
|---|---|---|---|---|
| 4A | 2414 | 235 | 508 | 1786 |
| 4B | 4500 | 606 | 855 | 1880 |

TABLE 3C

| Composition | TEOS:SiN-PE | TEOS:SiN-LP | TEOS:PolySi |
|---|---|---|---|
| 4A | 10 | 5 | 1 |
| 4B | 7 | 5 | 2 |

As is readily apparent from the results set forth in Tables 3B and 3C, composition 4B (including the cubiform ceria abrasive) had significantly higher TEOS and SiN removal rates than composition 4A (including the control ceria) (about 1.9× greater for TEOS, about 2.6× greater for SiN-PE, and about 1.7× greater for SiN-LP) while the polysilicon removal rates were similar. As a result composition 4B unexpectedly exhibited increased TEOS and SiN removal rates, a reduced TEOS to SiN-PE selectivity, and a 70 percent increase in TEOS to polysilicon selectivity as compared to composition 4A. Moreover, the cubiform ceria based composition increased SiN-PE removal rates more significantly than SiN-LP (150 percent vs. 70 percent).

Example 5

Two polishing compositions were tested to evaluate TEOS, SiN-PE, SiN-LP, and PolySi polishing rates. Each composition included 4-dodecylbenzenesulfonic acid and ceria at pH 10. Composition 5A included the control ceria described above in Example 2 while composition 5B included the cubiform ceria described above in Example 1. Point of use concentrations are as indicated in Table 4A.

TABLE 4A

| Composition | Ceria | 4-Dodecylbenzenesulfonic acid | pH |
|---|---|---|---|
| 5A | 0.5 wt % Control | 0.1 wt % | 10 |
| 5B | 0.5 wt % Cubiform | 0.1 wt % | 10 |

Blanket TEOS, SiN-PE, SiN-LP, and PolySi wafers were polished for 60 seconds on a Mirra® tool at the conditions listed above. Polishing results are shown in Table 4B. All removal rates (RR) are listed in angstroms per minute (Å/min). TEOS:SiN-PE, TEOS:SiN-LP and TEOS:PolySi selectivies are listed in Table 4C.

TABLE 4B

| Composition | TEOS RR | SiN-PE RR | SiN-LP RR | PolySi RR |
|---|---|---|---|---|
| 5A | 1225 | 66 | 52 | 164 |
| 5B | 2449 | 84 | 107 | 175 |

TABLE 4C

| Composition | TEOS:SiN-PE | TEOS:SiN-LP | TEOS:PolySi |
|---|---|---|---|
| 5A | 19 | 24 | 7 |
| 5B | 29 | 23 | 14 |

As is readily apparent from the results set forth in Tables 4B and 4C, composition 5B (including the cubiform ceria abrasive) had increased the TEOS and SiN-LP removal rates (by about 2× and 1.3× respectively) as compared to composition 5A (including the control ceria) while the polysilicon removal rates were similar. As a result composition 5B unexpectedly exhibited increased TEOS and SiN-LP removal rates, a 50 percent increase in TEOS to SiN-PE selectivity, and a 2× increase in TEOS to polysilicon selectivity as compared to composition 5A. Moreover, the cubiform ceria based composition unexpectedly increased SiN-LP removal rates more significantly than SiN-PE (100 percent vs. 25 percent).

Example 6

Four polishing compositions were tested to evaluate TEOS, SiN-PE, SiN-LP, and PolySi polishing rates. Each composition included either polyvinylpyrrolidone (PVP) (6A and 6B) or poly(vinylpyrrolidone-co-vinyl acetate) (PVP-co-VA) (6C and 6D) and ceria at pH 5. Compositions 6A and 6C included the control ceria described above in Example 2 while compositions 6B and 6D included the cubiform ceria described above in Example 1. Point of use concentrations are as indicated in Table 5A.

TABLE 5A

| Composition | Ceria | PVP | PVP-co-VA | pH |
|---|---|---|---|---|
| 6A | 1 wt % Control | 0.41 wt % | 0 | 5 |
| 6B | 1 wt % Cubiform | 0.41 wt % | 0 | 5 |
| 6C | 1 wt % Control | 0 | 0.41 wt % | 5 |
| 6D | 1 wt % Cubiform | 0 | 0.41 wt % | 5 |

Blanket TEOS, SiN-PE, SiN-LP, PolySi wafers were polished for 60 seconds on a Mirra® tool at the conditions listed above. Polishing results are shown in Table 5B. All removal rates (RR) are listed in angstroms per minute (Å/min). TEOS:SiN-PE, TEOS:SiN-LP and TEOS:PolySi selectivies are listed in Table 5C.

TABLE 5B

| Composition | TEOS RR | SiN-PE RR | SiN-LP RR | PolySi RR |
|---|---|---|---|---|
| 6A | 2666 | 1135 | 603 | 211 |
| 6B | 681 | 1302 | 755 | 208 |
| 6C | 3250 | 1038 | 567 | 158 |
| 6D | 4502 | 1205 | 681 | 203 |

TABLE 5C

| Composition | TEOS:SiN-PE | TEOS:SiN-LP | TEOS:PolySi |
|---|---|---|---|
| 6A | 2 | 4 | 13 |
| 6B | 0.5 | 0.9 | 3 |
| 6C | 3 | 6 | 21 |
| 6D | 4 | 7 | 22 |

As is readily apparent from the results set forth in Tables 5B and 5C, composition 6D (including the cubiform ceria abrasive and the copolymer poly(vinylpyrrolidone-co-vinyl acetate)) exhibited a greater removal rate of TEOS, SiN, and polysilicon as compared to composition 6C (including the control ceria and the same copolymer). However, composition 6B (including the cubiform ceria abrasive and the homopolymer polyvinylpyrrolidone) unexpectedly had a 4× smaller TEOS removal rate and 15% greater removal rate on SiN-PE and a 25% greater removal rate on SiN-LP than composition 6A (including the control ceria and the same homopolymer). Composition 6B was surprisingly selective to silicon nitride (having a 2:1 selectivity of SiN-PE to TEOS).

Example 7

Three polishing compositions were tested to evaluate the effect of lanthanum doping level in the cubiform ceria abrasive particles on the TEOS removal rate. Composition 7A included 0.28 weight percent of the control ceria described above in Example 2. Composition 7B included 0.28 weight percent cubiform ceria abrasive particles including 2.5 mole percent lanthanum oxide and was prepared by diluting the stock ceria dispersion described above in Example 1 with 34 parts water to 1 part stock ceria dispersion. Composition 7C included 0.28 weight percent cubiform ceria abrasive particles including 10 mole percent lanthanum oxide and was prepared by diluting the ceria dispersion described in the following paragraphs with 34 parts water to 1 part ceria dispersion. Each of compositions 7A-7C had a pH of 4.

A cerium oxide dispersion was prepared as follows. A cerium nitrate solution was prepared by combining 11.5 kg of a 3M trivalent cerium(III) nitrate solution, 1.3 kg of a 3M lanthanum nitrate solution, 1.86 kg of a 68% nitric acid ($HNO_3$) solution, 0.5 kg deionized water, and cerium(IV) nitrate at a molar ratio of cerium(IV) to cerium (total) equal to 0.0000125 (1/80,235). The cerium nitrate solution was then degassed with agitation and nitrogen bubbling in a 20 L vessel.

An aqueous ammonia solution was prepared by combining 70 kg of deionized water and a solution of 14 kg of 25% aqueous ammonia (such that the molar ratio of $NH_4OH$ in the aqueous ammonia solution to the total cerium and lanthanum in the cerium nitrate solution was 10). The aqueous ammonia solution was then degassed with agitation and nitrogen bubbling in a 100 L vessel jacketed reactor.

The cerium nitrate solution was then added, at ambient temperature, to the aqueous ammonia solution with the same agitation under nitrogen purging. The temperature of the reaction mixture was then increased to 88° C. and held at that temperature for 13.5 hours. The reaction mixture was then left to cool and upon cooling was acidified to pH 2 by adding 68% nitric acid.

The reaction mixture was then filtrated and washed with deionized water. The washing was repeated when the conductivity of the washing solution was less than 0.04 mS/cm. Deionized water was added to adjust the final cubiform ceria abrasive concentration to 10 weight percent. The cubiform ceria abrasive particles included 10 mole percent lanthanum oxide and 90 mole percent cerium oxide.

The BET specific surface area was determined by nitrogen adsorption to be 8.6 $m^2$ per gram. The average particle size was 142 nm as measured by Malvern Zetasizer.

Blanket TEOS wafers were polished for 60 seconds on a Mirra® tool at the conditions listed above. Polishing results are shown in Table 6. All removal rates (RR) are listed in angstroms per minute (Å/min).

TABLE 6

| Composition | Abrasive | TEOS RR |
|---|---|---|
| 7A | First Control Ceria | 3819 |
| 7B | Cubiform Ceria with 2.5% La | 6388 |
| 7C | Cubiform Ceria with 10% La | 6285 |

As is readily apparent from the data set forth in Table 6, compositions 7B and 7C exhibited equivalent TEOS removal rates that are greater than 1.6× the removal rate of composition 7 Å.

Example 8

Three polishing compositions were tested to evaluate the effect of lanthanum doping level in the cubiform ceria abrasive particles on the TEOS removal rate. Each of compositions 8A and 8B included 83.3 ppm by weight picolinic acid, 1000 ppm by weight of poly(ethylene glycol) (MW about 8000 g/mol), 10.7 ppm by weight Kordek MLX, and 0.4 weight percent ceria abrasive. Composition 8A included the control ceria (Example 2). Composition 8B included cubiform ceria abrasive particles including 2.5 mole percent lanthanum oxide. Composition 8C included 58.3 ppm by weight picolinic acid, 700 ppm by weight of poly(ethylene glycol) (MW about 8000 g/mol), 7.5 ppm by weight Kordek MLX, and 0.28 weight percent cubiform ceria abrasive particles including 10 mole percent lanthanum oxide. Each of compositions 8 Å-8C had a pH of 4.

Blanket TEOS wafers were polished for 60 seconds on a Mirra® tool at the conditions listed above. Polishing results are shown in Table 7. All removal rates (RR) are listed in angstroms per minute (Å/min).

TABLE 7

| Composition | Abrasive | TEOS RR |
|---|---|---|
| 8A | Control | 3281 |
| 8B | Cubiform Ceria with 2.5% La | 5190 |
| 8C | Cubiform Ceria with 10% La | 5250 |

As is readily apparent from the results set forth in Table 7, the cubiform ceria based compositions (8B and 8C) exhibited similar TEOS removal rates. Moreover, both cubiform ceria compositions exhibited a significantly improved TEOS removal rate as compared to the control (about a 60 percent improvement).

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that the disclosure includes numerous embodiments beyond those included above in the Examples. These embodiments include, but are not limited to the embodiments listed in the appended claims.

The invention claimed is:

1. A chemical mechanical polishing composition comprising:

a liquid carrier;

about 0.01 to about 2 weight percent of cubiform ceria abrasive particles at point of use, the cubiform ceria abrasive particles dispersed in the liquid carrier, wherein the cubiform ceria abrasive particles have an average particle size in a range from about 50 to about 500 nm, wherein the cubiform ceria abrasive particles have a BET surface area in a range from about 3 $m^2/g$ to about 14 $m^2/g$, and wherein the cubiform ceria abrasive particles comprise a mixture of cerium oxide and lanthanum oxide; and at least one of an anionic compound and a nonionic compound, wherein the anionic compound or the nonionic compound is in a concentration of about 0.01 weight percent to about 2 weight percent of at point of use, and wherein the pH is in a range from about 9 to about 11.

2. The composition of claim 1, wherein the cubiform ceria abrasive particles have a molar ratio of lanthanum to lanthanum plus cerium in a range from about 1 to about 15 percent.

3. The composition of claim 1, wherein the cubiform ceria abrasive particles have a BET surface area in a range from about 7 $m^2/g$ to about 13 $m^2/g$.

4. The composition of claim 1, wherein the anionic compound comprises a water-soluble polyelectrolyte, polyanions, polyacids, polyacrylates, poly(vinyl acid), anionic detergents, alkyl or alkyl ether sulfonates and sulfates, alkyl or alkyl ether phosphonates and phosphates, and alkyl or alkyl ether carboxylates.

5. The composition of claim 1, wherein the anionic compound is an anionic homopolymer or copolymer and comprises at least one monomer unit selected from acrylic acid, methacrylic acid, maleic acid, vinyl sulfonic acid, sulfate, styrene sulfonic acid and phosphate.

6. The composition of claim 1, wherein the anionic compound comprises poly(acrylic acid), poly(methacrylic acid), poly(maleic acid), poly(vinyl sulfonic acid), poly (styrene sulfonic acid), poly(vinyl sulfate), poly(2-acrylamido-2-methyl-1-propanesulfonic acid), poly(vinyl phosphoric acid), poly(methyl methacrylate-co-methacrylic acid, poly(acrylic acid-co-maleic acid), poly(acrylamide-co-acrylic acid), poly(4-styrenesulfonic acid-co-maleic acid), or a combinations thereof.

7. The composition of claim 1, wherein the anionic compound is a non-polymeric compound and comprises an alkyl or alkyl aryl sulfate, an alkyl or alkyl aryl sulfonate, an alkyl or alkyl aryl phosphate, an alkyl or alkyl aryl carboxylate, or a combination thereof.

8. The composition of claim 1, wherein the anionic compound is dodecylbenzene sulfonic acid, ammonium lauryl sulfate, stearic acid, dihexaphosphate, dodecylphosphoric acid, 1-decanesulfonate, a derivative thereof, an ammonium or sodium salt thereof, or a combination thereof.

9. The composition of claim 1, wherein the nonionic compound is a nonionic polymer comprising water-soluble polyethers, polyether glycols, alcohol ethoxylates, polyoxyalkylene alkyl ethers, polyesters, vinyl acrylates, or a combination thereof.

10. The composition of claim 9, wherein the nonionic compound is an nonionic homopolymer or copolymer and comprises polyvinyl acetate, polyvinyl alcohol, polyvinyl acetal, polyvinyl formal, polyvinyl butyral, polyvinylpyrrolidone, poly(vinyl phenyl ketone), poly(vinylpyridine), poly(vinylimidazole), poly(acrylamide), polyacrolein, poly (methyl methacrylic acid), polyethylene, polyoxyethylene lauryl ether, polyhydroxyethylmethacrylate, poly(ethylene glycol) monolaurate, poly(ethylene glycol) monooleate, poly(ethylene glycol) distearate, poly(vinyl acetate-co-methyl methacrylate), poly(vinylpyrrolidone-co-vinyl acetate), poly(ethylene-co-vinyl acetate), and combinations thereof.

11. The composition of claim 1, comprising from about 0.01 to about 2 weight percent of the cubiform ceria abrasive particles at point of use, wherein:

the cubiform ceria abrasive particles comprise a mixture of cerium oxide and lanthanum oxide and have an average particle size in a range from about 50 to about 500 nm;

the nonionic compound comprises polyvinylpyrrolidone, poly(vinylpyrrolidone-co-vinyl acetate), or a mixture thereof; and the composition has a pH in a range from about 9 to about 11.

12. The composition of claim 1, comprising from about 0.01 to about 2 weight percent of the cubiform ceria abrasive particles at point of use, wherein:

the cubiform ceria abrasive particles comprise a mixture of cerium oxide and lanthanum oxide and have an average particle size in a range from about 50 to about 500 nm;

the anionic compound comprises poly(methacrylic acid), poly(vinyl sulfonic acid), poly(styrene sulfonic acid), poly(2-acrylamido-2-methyl-1-propanesulfonic acid), poly(4-styrenesulfonic acid-co-maleic acid), dodecylbenzene sulfonic acid, or a mixture thereof; and the composition has a pH in a range from about 9 to about 11.

* * * * *